United States Patent [19]

Satoh

[11] 4,148,081
[45] Apr. 3, 1979

[54] VOLUME CONTROLLED TAPE END ALARM FOR TAPE RECORDER

[75] Inventor: Ken Satoh, Hachioji, Japan

[73] Assignee: Olympus Optical Company, Ltd., Tokyo, Japan

[21] Appl. No.: 860,834

[22] Filed: Dec. 15, 1977

[30] Foreign Application Priority Data

Dec. 20, 1976 [JP] Japan ............................ 51-171355[U]

[51] Int. Cl.$^2$ ............................................. G11B 15/06
[52] U.S. Cl. .......................................... 360/67; 360/74; 360/79; 360/137; 340/259; 340/675; 360/74.1
[58] Field of Search ...................... 360/67, 137, 74, 79, 360/90; 340/259, 260; 226/45; 242/57

[56] References Cited

U.S. PATENT DOCUMENTS

| 3,497,635 | 2/1970 | Schneider | 360/74 |
| 3,562,441 | 2/1971 | Bretschneider | 360/137 X |
| 3,566,132 | 2/1971 | Walker | 360/74 X |
| 3,660,810 | 5/1972 | Yoshil | 360/74 X |
| 4,003,093 | 1/1977 | Satoh | 360/137 |
| 4,005,486 | 1/1977 | Satoh | 360/74 X |

Primary Examiner—John H. Wolff
Attorney, Agent, or Firm—Ostrolenk, Faber, Gerb & Soffen

[57] ABSTRACT

A volume controlled tape and alarm for a tape recorder is disclosed. The tape end alarm is coupled between a microphone and an audio amplifier and includes an automatic gain control circuit for maintaining a constant recording level, an oscillator for generating an audio frequency signal, and a variable volume control resistor for coupling the output of the oscillator circuit to the automatic gain control circuit. The volume of the audio alarm signal can be adjusted by adjusting the position of an externally adjustable knob connected to the variable resistor.

8 Claims, 1 Drawing Figure

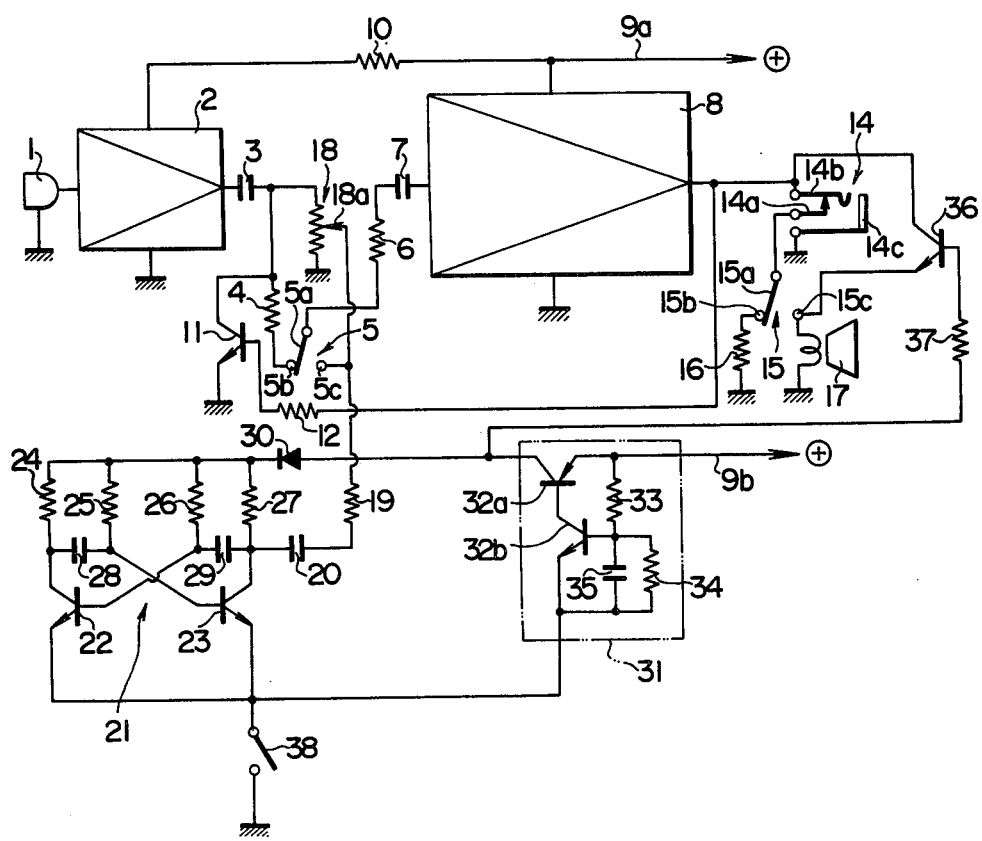

VOLUME CONTROLLED TAPE END ALARM FOR TAPE RECORDER

BACKGROUND OF THE INVENTION

The invention relates to a volume controlled tape end alarm for tape recorder.

In order to avoid the exertion of an excessive load on a tape feed mechanism, and to assure that information to be recorded will not be lost, it is desirable to provide a tape end warning signal, such as an audible alarm, whenever an end of tape condition occurs. Since an alarm of this kind can be entirely constructed as an electrical circuit, it can be advantageously constructed in a compact form.

However, when it is desirable to record secretly, it is necessary to avoid revealing the fact that the tape recorder is in operation. To this end, it is necessary to prevent the activation of the audible alarm. In the past, this result has been achieved by providing a switch associated with the earphone jack which operates to deactivate the alarm circuit when the earphone is used. The primary drawback of this arrangement is that an adaptor in the form of an earphone, or a dummy resistor corresponding to the earphone, must be inserted in the earphone jack to conceal the audible alarm. The adaptor must be carried about whenever the recorder is used, presenting an inconvenience.

SUMMARY OF THE INVENTION

It is an object of the invention to provide a novel tape end alarm for tape recorder which includes an automatic gain control circuit (hereinafter AGC) for maintaining a constant recording level, an alarm circuit for producing an audible alarm when the tape end is reached and a variable volume control resistor. The alarm for supplying the output of said alarm circuit to said AGC, is simple in construction and comprises an oscillator, preferably an astable multivibrator. Since the output of the alarm circuit is connected to the AGC through a variable resistor, it is possible to control the volume of the audible alarm in accordance with the surrounding circumstances. Thus, the audible alarm may be suppressed when the recording operation should take place in secret by turning the variable resistor to is zero value.

In accordance with the invention, the volume of the audible alarm can be adjusted to any desired value by adjusting the position of an external knob connected to the variable volume control resistor incorporated into the tape recorder. The variable resistor can be reset to the zero level when a secret recording is desired. Since the variable resistor is incorporated into the tape recorder, there is no necessity to utilize an adaptor as required with the prior art circuitry.

BRIEF DESCRIPTION OF THE DRAWING

The single drawing is a circuit diagram of the electrical circuit of a tape recorder which includes a volume controlled tape end alarm constructed according to one embodiment of the invention.

DESCRIPTION OF PREFERRED EMBODIMENT

Referring to the drawing, there is shown a microphone 1 which is connected with a recording amplifier 2, the output of which is fed through a capacitor 3, a resistor 4, a record/playback changeover switch 5, resistor 6 and capacitor 7 to an audio amplifier 8. The output of the amplifier 8 feeds a record/playback head, not shown. The both amplifiers 2, 8 are of conventional designs and are energized from a supply bus 9a. It will be noted that a resistor 10 is connected in the supply bus 9a before it is connected with the amplifier 2. The changeover switch 5 includes a movable contact 5a, which can be thrown to either stationary contact 5b or 5c. During a playback mode, the movable contact 5a is thrown to the recording terminal 5b. The junction between capacitor 3 and resistor 4 is connected with the collector of transistor 11, which cooperates with the capacitor 3 to form an AGC circuit which is effective to maintain constant recording level during a record mode. The transistor 11 has its base connected through resistor 12 with the output of the audio amplifier 8, and its emitter connected with the ground.

The output of the audio amplifier 8 is connected with an earphone jack 14 and thence to a record/playback changeover switch 15. As is well recognized, the earphone jack 14 comprises a movable contact 14a and stationary contacts 14b and 14c. When the earphone is not in use, the movable contact 14a engages the stationary contact 14b as shown. The stationary contact 15a of the changeover switch 15 is connected with the movable contact 14a of the jack. The switch 15 includes a movable contact 15a which is movable between stationary contacts 15b and 15c. During a record mode, the movable contact 15a is connected to the contact 15b. During a playback mode, movable contact 15a is connected to the stationary contact 15c. The stationary contact 15b is connected to ground through resistor 16 while the other stationary contact 15c is connected to ground via the exciting coil of a loudspeaker 17.

A variable resistor 18 representing a volume control is connected with the junction between the capacitor 3 and the stationary contact 5c of the changeover switch 5, and includes a movable tap 18a which is connected with the output of an audio frequency oscillator 21 through a series combination of a coupling resistor 19 and capacitor 20. The oscillator 21 comprises a pair of transistors 22, 23 which are cross coupled using resistors 24, 25, 26 and 27 and capacitors 28 and 29 so as to form an astable multivibrator. One end of each of resistors 24 to 27 is connected through a diode 30 with a supply bus 9b through a delay circuit 31.

The delay circuit 31 comprises a pair of transistors 32a and 32b, resistors 33, 34 and capacitor 35. The transistor 32a has its emitter connected with the supply bus 9b. A resistor 33 is connected between supply bus 9b and the base of transistor 32b. The collector of the transistor 32a is connected to both diode 30 of oscillator 21 and to the base of a switching transistor 36 via resistor 37. The collector of the transistor 32b is connected with the base of the transistor 32a, and the emitter of the transistor 32b is connected to the emitter of both transistors 22, 23. The emitters of transistors 22, 23 and 32b are all connected to ground through a tape end detecting switch 38. A resistor 34 and a capacitor 35 are connected in parallel with each other and with the base-emitter path of the transistor 32b. Resistor 33 is connected in series with capacitor 35 to form a time constant circuit.

The switching transistor 36 has its collector connected with the stationary contact 14b of the jack 14 and its emitter connected with the stationary contact 15c of the changeover switch 15.

The tape end detecting switch 38 is constructed to be closed by tape end detecting means of known form when it is detected that the end of a running tape is reached. When switch 38 is closed, audio frequency oscillator 21 is activated and supplies an operating voltage to base of the transistor 36, rendering it conductive. Delay circuit 31 prevents oscillator 21 from being activated in response to a momentary closure of the switch 38 which may be caused by oscillations or vibrations.

During a recording mode, the output of oscillator 21 is fed through capacitor 20, variable resistor 18, resistor 4, changeover switch 5, resistor 6 and capacitor 7 to audio amplifier if switch 38 has been closed and oscillator 21 has been activated, the audio amplifier 8 feeds the output of oscillator 21 to loudspeaker 17 through the then conducting transistor 36, thus giving off an audible alarm. With the apparatus of the present invention, the volume of the audible alarm can be continuously adjusted by adjusting the position of externally operating knob connected to the movable tap 18a of the variable resistor 18. Accordingly, whenever the recording should take place in secret, the tap 18a may be set to a zero position.

When the record/playback changeover switches 5, 15 are switched to establish a playback mode, the movable contacts 5a, 15a are thrown to the stationary contacts 5c, 15c. A playback signal produced by a record/playback head (not shown) is fed through part of the amplifier 2, capacitor 3, volume control 18, changeover switch 5, resistor 6 and capacitor 7 to the audio amplifier 8. The output of the amplifier 8 is supplied through the stationary contact 14b of the earphone jack 14, movable contact 14a and changeover switch 15 to energize the loudspeaker 17, which therefore gives off an audible sound. When the switch 38 is closed in response to the detection of the end of a running tape being reached, and alarm signal produced by the audio frequency oscillator 21 is passed through the capacitor 20, resistor 19, changeover switch 5, resistor 6 and capacitor 7 to the audio amplifier 8, and is thence fed to the loudspeaker 17 by following the same path as the playback signal, to be reproduced as an audible alarm. In this manner, during a playback mode, the audible alarm is reproduced at a predetermined level independently of the adjustment of the variable resistor 18.

The present invention may be embodied in other specific forms without departing from the spirit or essential attributes thereof and, accordingly, reference should be made to the appended claims, rather than to the foregoing specification as indicating the scope of the invention.

What is claimed is:

1. A tape recorder, including a tape end warning apparatus, said tape recorder comprising:
    (A) a microphone for converting an acoustical signal into an electrical signal;
    (B) alarm signal generating means for generating an oscillating signal responsive to the detection of an end of tape condition;
    (C) means for generating a playback signal representative of magnetic information stored on a magnetic record medium;
    (D) human actuatable switch means for selectively placing said recorder in a record or playback mode;
    (E) audio amplifier means for amplifying an audio frequency signal applied thereto;
    (F) means responsive to the audio frequency signal amplified by said audio amplifier means for generating a magnetic recording signal when said recorder is in said record mode, for generating an acoustical playback signal when said recorder is in said playback mode, and for generating an acoustical alarm signal when said alarm signal generating means generates said oscillating signal;
    (G) means, including an automatic gain control circuit, for applying a varying percentage of said electrical signal to said audio amplifier when said recorder is in said record mode, said varying percentage being determined by said automatic gain control circuit in such a manner that said recorder records at a constant recording level; and
    (H) means, including a variable resistor, for:
        (1) applying a first percentage of said playback signal to said audio amplifier when said recorder is in said playback mode, said first percentage being determined by the setting of said variable resistor whereby said variable resistor operates to control the playback volume of said tape recorder when said tape recorder is in a playback mode; and
        (2) applying a second percentage of said oscillating signal to said audio amplifier when said recorder is in said record mode, said second percentage being determined by the setting of said variable resistor whereby said variable resistor operates to control the volume of said acoustical alarm signal when said recorder is in said record mode.

2. The tape recorder of claim 1, wherein said variable resistor includes a resistance element and a slide arm, one end of said resistance element being connected via a capacitor to the output of a recording amplifier which amplifies said electrical signal, said one end of said resistance element also being connected to an input of said automatic gain control circuit, the remaining end of said resistance element being grounded, said slide arm being connected to the output of said alarm signal of said alarm signal generating means via a series connected resistor and capacitor.

3. A tape recorder according to claim 1 in which said audio amplifier means is connected with a loudspeaker through a switching transistor which is rendered conductive by said alarm signal generating means when said alarm signal generating means detects an end of tape condition during said record mode.

4. A tape recorder, including a tape end warning circuit, comprising:
    means for generating a recording signal;
    means for generating a playback signal;
    audio amplifier means for amplifying an audio frequency input signal applied thereto;
    first switch means for selectively applying said recording signal and said playback signal to said audio amplifier means when said recorder is placed in a record and playback mode, respectively;
    speaker means for generating an audio output when an audio frequency electrical signal is applied thereto;
    second switch means for applying the output of said audio amplifier means to said speaker means when said recorder is placed in said playback mode;
    alarm circuit means for generating an audio frequency alarm signal whenever an end of tape condition is detected;

third switch means for applying the output of said audio amplifier means to said speaker means whenever said recorder is placed in said record mode and said alarm circuit means generates said alarm signal;

variable resistor means for applying a percentage of said audio frequency alarm signal to said audio amplifier means whenever said recorder is placed in said record mode, said percentage being determined by the setting of said variable resistor whereby said speaker means generates an audio alarm having a magnitude determined by the setting of said variable resistor means whenever a tape end condition is detected and said recorder is in said record mode.

5. A tape recorder according to claim 4 further including constant resistor means for applying said audio frequency alarm signal to said audio amplifier means whenever said recorder is placed in said playback mode whereby said speaker means generates an audio alarm having a predetermined magnitude whenever a tape end condition is detected and said recorder is in said playback mode.

6. The apparatus of claim 5 wherein said third switch means comprises a transistor whose base is coupled to the output of said alarm circuit means and whose emitter and collector are coupled between said audio amplifier means and said audio speaker means.

7. The apparatus of claim 6 wherein said alarm circuit means comprises:
a mechanical switch which is closed upon the detection of a tape end condition;
an oscillator circuit which is energized upon the closure of said switch.

8. The apparatus of claim 7 further including an automatic gain control circuit coupled between said means for generating a recording signal and said audio amplifier means.

* * * * *